(12) United States Patent
Gopal

(10) Patent No.: US 10,970,748 B2
(45) Date of Patent: Apr. 6, 2021

(54) CHANNEL INTEGRATION

(71) Applicant: NCR Corporation, Duluth, GA (US)

(72) Inventor: Niraj Gopal, Hyderabad (IN)

(73) Assignee: NCR Corporation, Atlanta, GA (US)

(*) Notice: Subject to any disclaimer, the term of this patent is extended or adjusted under 35 U.S.C. 154(b) by 220 days.

(21) Appl. No.: 14/266,055

(22) Filed: Apr. 30, 2014

(65) Prior Publication Data
US 2015/0242894 A1 Aug. 27, 2015

(30) Foreign Application Priority Data

Feb. 24, 2014 (IN) .............................. 912/CHE/2014

(51) Int. Cl.
G06Q 30/02 (2012.01)
G06Q 20/18 (2012.01)
G07F 19/00 (2006.01)

(52) U.S. Cl.
CPC ......... *G06Q 30/0269* (2013.01); *G06Q 20/18* (2013.01); *G06Q 30/0256* (2013.01); *G07F 19/211* (2013.01)

(58) Field of Classification Search
CPC .. G07F 19/211; G06Q 30/0256; G06Q 20/18; G06Q 30/0269
See application file for complete search history.

(56) References Cited

U.S. PATENT DOCUMENTS

| 2004/0029563 | A1* | 2/2004 | Berg | G07C 9/00007 455/410 |
| 2009/0150239 | A1* | 6/2009 | Dorman | G06Q 30/02 705/14.36 |
| 2009/0234713 | A1* | 9/2009 | Bi | G06Q 30/02 705/14.54 |
| 2011/0093327 | A1* | 4/2011 | Fordyce, III | G06Q 20/10 705/14.39 |
| 2012/0310732 | A1* | 12/2012 | Heiser, II | G06Q 30/02 705/14.45 |
| 2013/0144785 | A1* | 6/2013 | Karpenko | G06Q 20/409 705/44 |
| 2013/0198032 | A1* | 8/2013 | Wallace | G06Q 30/0601 705/26.8 |
| 2014/0067533 | A1* | 3/2014 | Gandhi | G06Q 30/02 705/14.53 |
| 2016/0232590 | A1* | 8/2016 | Abbott | H04L 67/02 |

OTHER PUBLICATIONS

"ObliviAd: Provably Secure and Practical Online Behavioral Advertising"; Michael Backes; IEEE 2012.*

* cited by examiner

*Primary Examiner* — Victoria E Frunzi
(74) *Attorney, Agent, or Firm* — Schwegman, Lundberg & Woessner

(57) ABSTRACT

A unique session is obtained and an anonymous session is generated that maps to the session. The anonymous session is passed to a selected advertisement service, and the selected advertisement service provides, in response thereto, an interface, which is proxied together with an existing interface of a device (associated with the unique session) during the unique session for a consumer to interact with the proxied interface on the device.

12 Claims, 4 Drawing Sheets

CHANNEL INTEGRATION

BACKGROUND

Automated Teller Machines (ATMs) are deployed in prime real-estate locations across the globe with captive consumers, who have ready access to their bank accounts from the ATMs.

Yet, because of the unique security required by financial transactions, the architectures of ATMs and their networks are restricted and closed. So, ATMs cannot be interfaced with open-advertisement systems; as a result, very few advertisements are capable of being pushed to a consumer while at an ATM. In most cases, the advertisements that are pushed are associated with a particular bank's Customer Relationship Management (CRM) system and knowledge about the customer.

Consider a consumer, who prior to transacting at an ATM was performing Internet searches on his/her computer for cameras and reviewing different types of cameras. A bank's CRM system, associated with the ATM that the consumer visits, is entirely unaware of the fact that the consumer is interested in a camera purchase. That is, the consumer activity, which may be tied to online activity, is entirely divorced from the bank's recorded preferences and habits for the consumer. So, the bank and other retailers, such as camera retailers, cannot take advantage of a consumer interacting with an ATM (with ready access to cash), who is actively searching for a new camera to purchase.

Consumers transacting at an ATM are considered high-value consumers because of their ready access to cash while that ATM, which permit the consumers to make purchases.

SUMMARY

In various embodiments, methods and system for channel integration are presented.

According to an embodiment, a method, comprises: aggregating, by a processor, a first profile of a consumer for a first channel with a second profile of the consumer for a second channel into an aggregated profile; and delivering, by the processor, a custom advertisement to the consumer having a session over at least one of: the first channel and the second channel using the aggregated profile.

Optionally, aggregating further includes obtaining the first profile from a financial service associated with ATM transactions of the consumer.

Optionally, delivering further includes providing the customized advertisement over an Internet session that is in progress between the consumer and a service provider.

According to an embodiment, a method for channel integration is provided. Specifically, in an embodiment, a transaction session identifier for a transaction of a consumer at a Self-Service Terminal (SST) is mapped to an anonymous session identifier. An advertisement service is selected and the anonymous session identifier is communicated to the selected advertisement service. Finally, facilitation results in proxying an advertisement interface, supplied by the selected advertisement service, with an existing interface, which is associated with the transaction occurring on the SST.

In an embodiment, mapping further includes acquiring the transaction session identifier from a financial service having access to the transaction.

In an embodiment, selecting further includes querying a plurality of advertisement services to select the selected advertisement service using consumer identifying information included with the transaction session identifier.

In an embodiment, selecting further includes determining the selected advertisement service based on evaluation of policy conditions for the transaction session identifier.

In an embodiment, communicating further includes providing a profile for the consumer to the selected advertisement service.

In an embodiment, communicating further includes providing consumer identifying information with the transaction session identifier to the selected advertisement service for the advertisement service to identify the consumer.

In an embodiment, facilitating further includes passing the advertisement interface as a script that is executed on the SST, and wherein script presentations are presented in a defined region representing an overlaid screen on a display of the SST, one or more other screens in remaining regions of the display housing presentations of the existing interface.

In an embodiment, facilitating further includes passing the transaction session identifier and the advertisement interface to a financial service having access to the transaction and the existing interface of the SST.

According to an embodiment, a transaction of a consumer on a SST is identified and a session identifier and identifying information for the consumer are identified from the transaction. The session identifier and the identifying information are supplied to a channel integration service. Finally, an advertisement interface supplied by the channel integration service is proxied, and presentations from the advertisement interface presented in a first screen of the SST with other presentations presented in one or more additional screens of the SST during the transaction.

In an embodiment, identifying further includes obtaining notice of the transaction from an intermediate server interposed between the SST and an enterprise servicing the transaction.

In an embodiment, obtaining further includes generating the session identifier based on the transaction and the identifying information.

In an embodiment, supplying further includes providing a consumer profile with the identifying information and the session identifier to the channel integration service.

In an embodiment, proxying further includes executing a script that produces the presentations in the first screen.

In an embodiment, proxying further includes relaying actions detected by the consumer during the transaction that occur within the first screen to the channel integration service. In an embodiment of the last embodiment, relaying further includes updating presentations within the first screen of the SST in response to response data received from the channel integration service.

According to an embodiment, a Self-Service Terminal (SST) includes: a display; and a proxy module. The proxy module operable to: (i) identifying a transaction at the SST; and (ii) proxy an advertisement interface producing first presentations on a first screen of the display simultaneously with other presentations produced during the transaction on at least one other screen of the display.

In an embodiment, the proxy module is further operable to: (iii) interact with a channel integration service to acquire the advertisement interface.

In an embodiment, the proxy module is further operable to: (iii) select an advertisement service to supply the advertisement interface.

In an embodiment, the proxy module is further operable to: (iii) supply a financial service with a session identifier that uniquely identifies the transaction. In an embodiment of the latter embodiment, the proxy module is further operable to: (iv) supply consumer identifying information and a customer profile for a consumer with the session identifier to the financial service, the consumer engaged in the transaction at the SST.

According to an embodiment a method comprises aggregating browsing activity by a person over one or more channels (ATM, mobile phone, Web, and the like) and associating that browsing activity with a customer account or profile for subsequent use. The subsequent use may include recommending products to that person or a person having a similar profile to that person. Alternatively, the subsequent use may include data analysis of the aggregated browsing activity.

DETAILED DESCRIPTION

Figure 1:
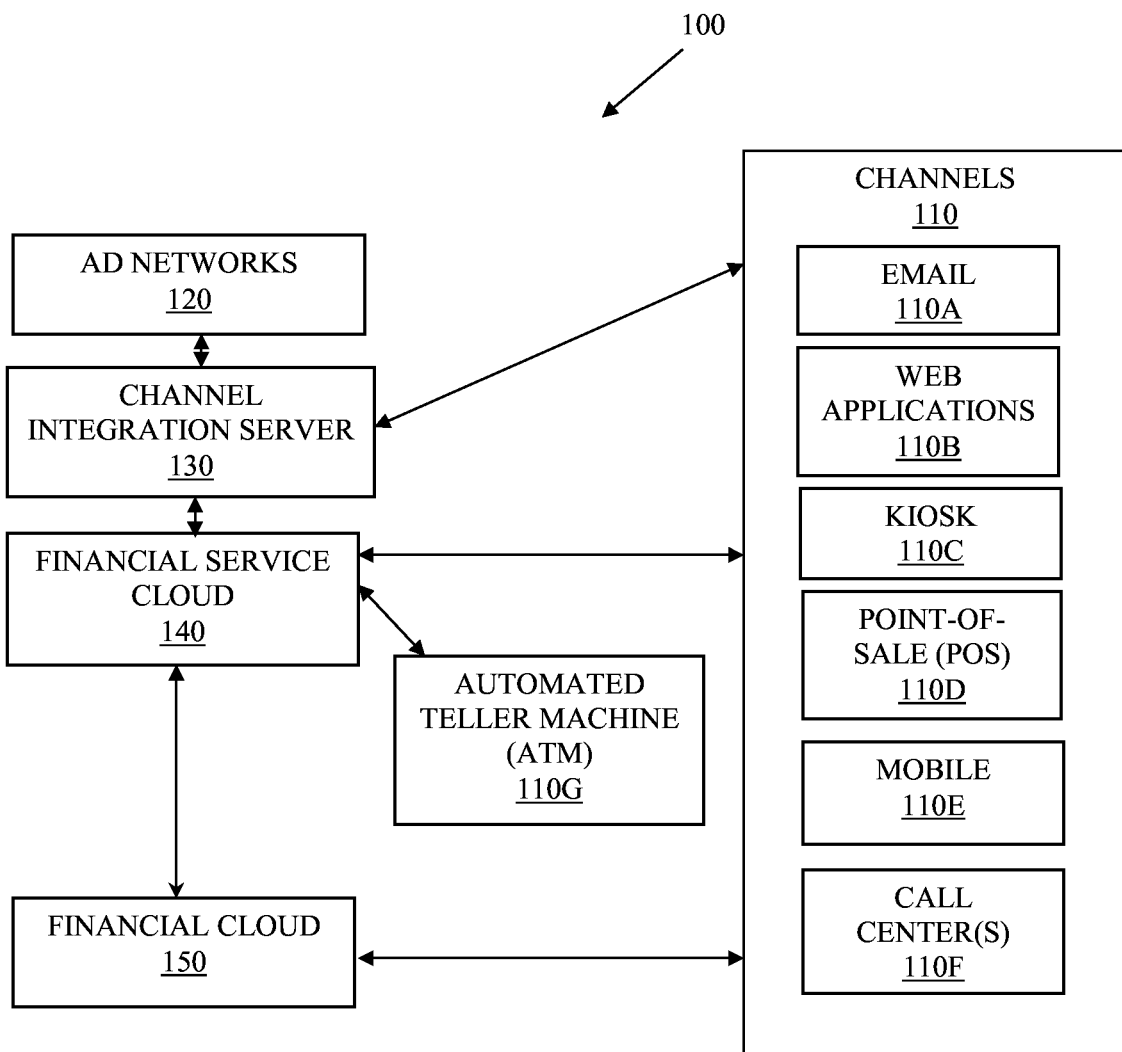
FIG. 1 is a diagram of an example architecture for practicing channel integration at an Automated Teller Machine (ATM), according to an example embodiment.

FIG. 1 is a diagram of an example architecture for practicing channel integration at an Automated Teller Machine (ATM), according to an example embodiment. The architecture 140 is shown schematically in greatly simplified form, with only those components relevant to understanding of this embodiment being illustrated. The various components are illustrated and the arrangement of the components is presented for purposes of illustration only. It is to be noted that other arrangements with more or less components are possible without departing from the channel integration presented herein and below.

The techniques, methods, and ATM 110G presented herein and below for channel integration can be implemented in whole or in part in one, all, or some combination of the components shown with the architecture 100. The techniques and methods are programmed as executable instructions in memory and/or non-transitory computer-readable storage media and processed on one or more processors associated with the components (may also be referred to as "modules").

In the embodiment for the architecture 100, the methods and ATM 110G are implemented as one or more hardware and software components of financial systems or integrated with financial systems.

Specifically, the architecture 100 permits a consumer transaction at an ATM 110G to experience the same directed marketing that the consumer experiences on other communication channels 110 while at the ATM 110G. This is achieved by obtaining or assigning a communication session identifier for a financial transaction that a consumer is performing at the ATM 110G and generating another anonymous session identifier that links the communication session identifier of the financial transaction. The financial service cloud 150 pushes the anonymous session identifier up to the channel integration server 130. The channel integration server 130 identifies and selects one or more ad networks 120 and passes the anonymous session identifier. This creates a direct link between a selected ad network 120 and the ongoing financial communication session occurring with the consumer on the ATM 110G. The select ad network 120 has access to one or more profiles of the consumer over tracked communication channels 110. So, now the selected ad network 120 can display targeted advertisements to the consumer on the ATM 110G that are in the same format that the selected ad network would present if the consumer was accessing one of the channels 110. The interface having the targeted advertisement (from the selected ad network 120) is overlaid on top of the ATM 110G interface for the financial transaction by the financial service cloud 140.

This provides consistency to the consumer and provides advertisers with access to a consumer when that consumer has ready access to a financial account associated with the financial transaction session.

In an embodiment, multiple profiles for a consumer span multiple channels 110 and are federated and integrated for usage in providing custom advertisements to a consumer at an ATM 110G. This can be achieved by acquiring access to customer profiles present over different channels 110 from that which is associated with the ATM 110G when a consumer is at the ATM 110G. These profiles (associated with the consumer) can be housed by existing ad networks 120 (such as Google™, Amazon™, Groupon™ Microsoft®, Adsense™, eBay®, and others). The channel integration server 130 provides a mechanism for interfacing and using existing Application Programming Interfaces (APIs) of the ad networks 120 to acquire the multiple profiles of the consumer. The profiles are then federated and, perhaps, normalized in a standard format and communicated to the financial service cloud 140. The financial service cloud 140 has the ability to provide an overlaid interface on the ATM 110G while a consumer is at the ATM 110G performing a financial transaction.

In an embodiment, the financial service cloud 140 has access to a financial cloud 150 to gain access (via an API to the financial cloud 150) to a consumer's profile tied to that consumer's financial institution. The federated and normalized profiles (which may now also include a financial profile known to the consumer's financial institution) are inspected to determine relevant advertisements to overlay (and provide access) on interfaces of the ATM 110G while the consumer is performing a financial transaction at the ATM 110G. The relevant information may be determined based on most recent known transactions and/or searches performed by the consumer over the channels 110, which are present in the federated and normalized profiles.

The architecture 100 is now discussed in greater detail along with its components in view of the discussion above. It is to be noted that the methods and ATM 110G presented herein are not just limited to ATM solutions; that is, any SST terminal (kiosk, etc.) 110C or Point-Of-Sale (POS) terminal 110D for any industry can benefit from the channel integration mechanisms discussed herein.

In an embodiment, the financial institution's consumer profiles associated with its existing CRM system can be exposed to the other ad networks 120 (through the channel integration server 130), assuming privacy laws are properly complied with and/or consent is acquired from the consumer and the financial institution when needed. This provides a consistent and up-to-date experience for the consumer regardless of the communication channel 110 being accessed by the consumer.

The architecture 100 includes communication channels 110, ad networks 120, a channel integration server 130, a financial service cloud 140, and a financial cloud 150. The channels 110 include channels tied to communications associated with: email 110A, Web applications (services over the Internet) 110B, a kiosk 110C, a POS device 110D, a mobile device 110E, a call center 110F, and an ATM 110G.

As used herein a "cloud" may be viewed as a processing environment that can be tied to a single server or multiple servers, which are geographically dispersed from one another. The cloud can also be logically constructed to include portions of multiple dispersed devices that are organized as one logical cloud processing environment.

The channels 110 represent transactions and/or actions that any given consumer may engage in. For example, the consumer may engage in email communications associated with a known (registered or used) email 110A for the consumer. The consumer may also have browser-based access to a variety of network services, which are associated with web applications 110B. The web applications 110B may, in some instances, include cookies, stored local to a processing device of the consumer, or stored remotely in a profile associated with the web applications 110B. Moreover, when the consumer interacts with a Kiosk 110C and/or a POS device 110D, the consumer may enter data (such as a loyalty card or credit card) that permits enterprise to capture and record profile data associated with the consumer. The consumer may also use mobile devices 110E to access some web applications 110B or to access mobile applications associated with services (Starbucks®, Walgreens®, Kroger®, Groupon™, and others). The profiles and actions associated with these mobile applications are also recorded and noted by various ad networks 120. The consumer can also, from time-to-time, call a call center 110F of a particular enterprise for purchases, support, complaints, etc. These interactions with call centers 110F are stored in profiles, in some instances, with various ad networks 120. Finally, the consumer has a known profile to his/her particular financial institution, which is retained for the consumer in a financial cloud 150 for the consumer.

As used herein, a "profile" includes a variety of information tied to a consumer. Some of this information includes, by way of example only, transaction history (electronic, phone, and/or in-person), contact history (electronic, phone, and/or in-person interactions noted by an enterprise when occurring with the consumer), complaints noted by the consumer (electronic, phone, and/or in-person), electronic search history, websites or services accessed by the consumer (electronic, phone, and/or in-person), preferences recorded by the consumer for various websites or services (electronic, phone, and/or in-person), and the like.

The ad networks 120 are existing services that acquire consumer profiles (and may federated disparate consumer profiles) over specific channels and, usually for, specific enterprises. For example, Groupon™ notes profiles and activities of consumers when using Groupon™; Google™ notes searches and websites accessed by a consumer and uses that profile information and cookies to target advertisements to consumers using its Adsense™ product; Amazon™ notes recorded preferences and activity of consumers for activity on its web site and devices, as does eBay® and Microsoft® and other enterprises also record profile information tied to their consumers. In many cases, these captured profiles for the consumers are accessible via APIs associated with the ad networks 120. In some situations, a consumer's cookie data stored in browsers on their processing devices have profile information that the ad networks 120 have access to when specific web applications or mobile applications are accessed by the consumer.

The channel integration server 130 passes an anonymous session handle/identifier for a consumer transacting at the ATM 110G. The actual financial transaction session handle mapped to the anonymous session identifier by the channel integration server 130. The financial transaction session identifier provided to the channel integration server 130 by the financial service cloud 140.

The channel integration server 130 also identifies one or more ad networks 130 (such as Google™ Adsense™) and uses an API of that selected ad network 130 to pass the anonymous session identifier and consumer identifying information obtained from the financial transaction session identifier. The selected ad network 130 then provides a target advertisement in an interface back to the channel integration server 130 along with the anonymous session identifier. The channel integration server 130 maps the anonymous session identifier to the financial transaction session identifier and supplies the financial transaction session identifier, the targeted advertisement in the ad network-supplied interface to the financial service cloud 140.

In an embodiment, the channel integration server 130 uses existing APIs of the ad networks 120 to access available profiles for a consumer. The acquired profiles may be in a variety of different formats and may include a variety of duplicate information for the consumer. So, the channel integration server 130 is operable to normalize the disparate profile formats and redact out duplicate information. The normalized format provides a single view of the consumer's multiple disparate profiles, which were acquired from the ad networks 120. The single consumer profile, in the normalized format, is communicated from the channel integration server 130 to the financial service cloud 140.

In an embodiment, the channel integration server 130 retains a database having the normalized profiles for consumers that have previously been identified, such that just updates to the normalized profile is needed in real time when a particular consumer is access the ATM 110G.

In an embodiment, the channel integration service 130 provides a financial profile (known by the financial cloud 150 and obtained from the financial service cloud 140) back to one or more of the ad networks 120. The ad network(s) 120 using the financial profile to service the consumer when the consumer has session on one of the channels 110A-110F with other known profiles that the ad network(s) have for the consumer over channels 110A-110F. This provides a mechanism to the ad networks 120 to have a financial profile for the consumer that they otherwise to not have and do not have access to because of the closed secure architecture associated with ATMs 110G.

The financial service cloud 140 provides the financial transaction identifier (for a financial transaction session that in progress between a consumer and a financial institution on the ATM 110G) to the channel integration server 130. In response (as noted above), the channel integration server 130 receives back the financial transaction session identifier and a targeted advertisement embedded in an interface being handled by the selected ad network 120.

The financial service cloud 140, then overlays the interface on top of one more for interface screens associated with the financial transaction session. The consumer can now interact with the overlaid interface directly with the selected ad network 120 from the ATM 110G during the financial transaction session. The ad network 120 sending advertisements and messages to its interface and receiving responses from the consumer by using the anonymous session identifier. The channel integration server 130 and the financial service cloud 140 acting as a proxy pipe between the ad network 120 and the ATM 110G where the consumer is performing the financial transaction session.

In an embodiment, when the anonymous session handle is passed to one of the ad networks 120, a financial profile for the consumer (acquired from the financial service cloud 140 and/or the financial cloud 150 by the channel integration server 130) is attached to the anonymous session handle in a format recognized by the ad network 120, such as and in one embodiment, as an anonymous session cookie. This allows whatever aggregated profile that the ad network 120 may have to be augmented with a financial profile of the consumer, which that ad network 120 previously did not have access to or knowledge about.

In another embodiment, when a consumer initiates a transaction at the ATM 110G to start a financial transaction, the financial service cloud 140, which provides services to the ATM 110G, is able to identify the consumer. The identity information is passed by the financial service cloud 140, using an API, to the channel integration server 130. The channel integration server 130 passes the identity information, using multiple APIs, to the ad networks 120; and the ad networks' APIs return multiple profiles back to the channel integration server 130 (the processing of which was presented above). The financial service cloud 140 may also use an API for a financial cloud (financial institution) 150 to acquire a financial profile for the consumer known and recorded by the financial institution. This profile is combined with the normalized profile (embodiment discussed above) acquired from the channel integration server 130. The financial service cloud 140 may determine based on inspection of the consumer's normalized profile and the consumer's financial profile one or more specific advertisements that are targeted to the consumer (at that point in time based on what is dynamically discovered about the consumer from the profiles). These one or more targeted advertisements are overlaid on top of the interface of the ATM 110G, as the consumer is performing a financial transaction. The determination of what advertisements to overlay on the existing interface of the ATM 110G during the transaction can be based on a variety of factors. Some of these factors can include, by way of example only, most recent consumer activity identified in the profiles, statistical analysis based on the consumer activity identified in the profiles, preferences noted in the profiles, time of day when the ATM 110G is accessed, calendar day when the ATM 110G is accessed, physical location of the ATM 110G, financial institution associated with the ATM 110G, and/or enterprise subscriptions and agreements for using the channel integration server 130. Moreover, it is noted, that the processing to resolve what advertisements to overlay can be achieved by the channel integration server 130, rather than the financial service cloud 140. In such a scenario, the channel integration server 130 provides the specific advertisements that are to be overlaid back to the financial service cloud 140. The resolution of the advertisements to overlay on the interface of the ATM 110G may also be outsourced to a third-party service that is provided the normalized profile and the financial profile of the consumer. This outsourcing can be done by the channel integration server 130 and/or the financial service cloud 140.

In the previous embodiment and in another embodiment, at least one ad network 120 includes an enhanced version of the channel integration server 130. This version of the channel integration server 130 provides a custom experience to the consumer while connected over channels 110A-110F by using the aggregated profile, which includes a financial profile acquired from the financial service cloud 140 and the financial cloud 150.

So, the consumer can be serviced in a consistent manner with consistent advertising interfaces and experiences while connected on channels 110A-110F or when connected to channel 110G.

According to an embodiment, the ad networks 120 perform profile aggregation over channels 110A-110F for a consumer and the channel 130 provides a mechanism when that consumer is connected over one or more of the channels 110A-110F during a session with another service provider to deliver a financial profile of the consumer to the ad networks 120, such that the ad networks 120 can augment their profiles for the consumer with the financial profile during the consumer's session over the one or more channels 110A-110F.

The advertisements may be activated, via the overlaid interface, to purchase a good or service associated with the advertisements. In an embodiment, the overlaid interface may provide a payment mechanism, such as the bank account being accessed, entry (manual, scanned, and/or swiped) of a payment card (gift or credit card), or an option to select a registered payment mechanism associated with the consumer (digital wallet (having real or a virtual currency (if permissible), credit card, loyalty rewards, PayPal™, and others).

In an embodiment, when a purchase is consummated at the ATM 110G, the overlaid interface may provide a notification code or Quick Response (QR) code (that the consumer can scan or take a picture of on his/her mobile device (phone, tablet, wearable processing device). The code or QR code can be used to pick/acquire the purchased good/service at a designated retail outlet by providing the code or QR code as evidence of the purchase. In some situations, the purchased good can be delivered to a registered address of the consumer, or acquired via a download from a website, perhaps, using the code or QR code.

In an embodiment, the transaction details, associated with a consumer purchasing a good or service via the overlaid interface, can be emailed to a registered email address for the consumer or texted to a registered phone number for the consumer. In some cases, the code, QR code, or website link is included in the email or text message.

The payment mechanism (in the overlaid interface) can be, in whole or in part, serviced via the interface provided by the selected ad network 120.

To further illustrate the power of the above-noted technique for integrating channel advertisements into ATM transactions an example scenario is presented.

Consider a consumer that prior to visiting an ATM 110G, performs one or more searches on cameras via a laptop using the Google™ search engine. Later that day or the next day, the consumer visits the ATM 110G to withdrawn funds (having not yet purchased a camera). When the consumer swipes his bank card at the ATM 110G, his name, and perhaps other data, is acquired by the financial service cloud 140. The financial service cloud 140 establishes or notes the financial transaction as a unique financial transaction session having a financial transaction session identifier. The financial service cloud 140 uses an API for the channel integration server 130 and passes the financial transaction session identifier with the consumer information to the channel integration server 130. The channel integration server 130 generates an anonymous session identifier that maps to the financial transaction session identifier and passes this information to a selected ad network 120. The ad network 120 acquires profile or federated profile information for the consumer and sends back an interface to the channel integration server 130. The channel integration server 130 maps the anonymous session identifier to the financial transaction session identifier and sends the financial transaction session identifier and interface supplied by the selected ad network 120 to the financial service cloud 140. The financial service cloud 140 overlays the interface of the ad network 140 on top of an existing interface being used by the consumer on the ATM 110G to perform the financial transaction. This creates a pipe being proxied by the financial service cloud 140 and the channel integration server 130 between the ad network 120 and the financial transaction via the interface. The ad network 120 identifies the consumer's searches for a new camera as occurring earlier in that day and provides a targeted camera advertisement (perhaps offering a discount if purchased now (while at the ATM 110G) by the consumer) in the overlaid interface. The consumer activates the advertisement and payment methods are provided to the consumer in the overlaid interface of the ATM 110G being serviced by the ad network 120. One payment mechanism is acquired as the consumer's bank account at a financial institution associated with the consumer's ATM transaction at the ATM 110G (that payment mechanism acquired through a financial profile from the financial cloud 150). The consumer authorizes a particular payment mechanism (such as a debit to his/her bank account) and a QR code is presented on the overlaid interface from the ad network 120. The consumer captures the QR code with his/her phone and goes to a nearby retailer and presents the QR code where the consumer picks up his/her new camera.

It is noted that a variety of operating scenarios are possible and the above-noted advertisement was presented to illustrate the power of one technique of the invention and was not intended to limit other operating scenarios achievable with the techniques presented herein.

Some of the above-noted aspects of the invention and other aspects are now presented and discussed with reference to the FIGS. 2-4.

Figure 2:
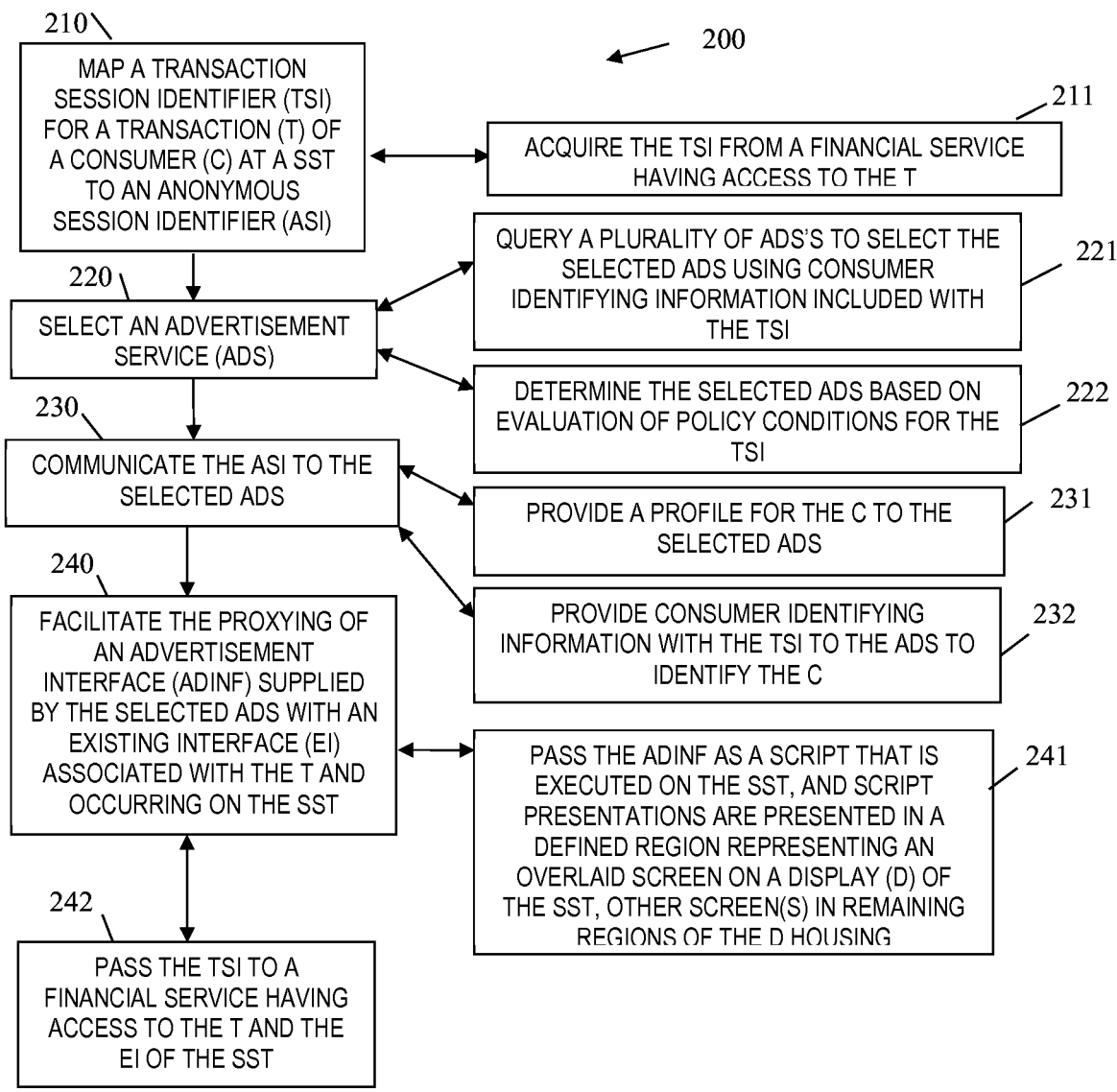
FIG. 2 is a diagram of a method for advertisement channel integration, according to an example embodiment.

FIG. 2 is a diagram of a method 200 for advertisement channel integration, according to an example embodiment. The software module(s) that implements the method 200 is referred to as a "channel integration manager." The channel integration manager is implemented as executable instructions programmed and residing within memory and/or a non-transitory computer-readable (processor-readable) storage medium and executed by one or more processors of a device. The processors of the device that executes the channel integration manager are specifically configured and programmed to process the channel integration manager. The channel integration manager has access to one or more networks during its processing. The networks can be wired, wireless, or a combination of wired and wireless.

In an embodiment, the channel integration manager is the channel integration server 130 of the FIG. 1.

At 210, the channel integration manager maps (or links) a transaction session identifier for a transaction of a consumer at a SST to an anonymous session identifier. The channel integration manager does this to comply with more meaningful information about the session to an advertisement service expected by the advertisement service and its API (the advertisement service is a selection from one of the ad networks 120). Moreover, by anonymizing the transaction session identifier, the channel integration manager provides security to the SST and its existing applications and environment, since absent the re-casted anonymous session identifier any selected advertisement service cannot discover details about the SST, its environment, or the transaction that the consumer is performing at the SST.

According to an embodiment, at 211, the channel integration manager acquires the transaction session identifier from a financial service having access to the transaction. Here, the SST is an ATM and the transaction is a financial transaction, such that the channel integration manager relies on a financial service, such as the financial service cloud 140, to supply details about the transaction. ATM's have very limited access and security is often restrictive in nature. The financial service often is able to acquire transaction data for the transaction because it is interposed between the ATM and the financial cloud 150 where the financial transaction is being processed. So, by establishing a trusted relationship and secure communications with the financial service, the channel integration manager is able to acquire some details regarding the financial transaction from the financial service.

At 220, the channel integration manager selects an advertisement service (advertisement network 120) for using in channel integration of advertisements that are being served to the consumer while at the SST. Selection of the advertisement service can occur in a variety of manners.

For example, at 221, the channel integration manager can formulate a search query that is used for querying a plurality of candidate advertisements services. The results of the query used to select the advertisement service. In one instance, the channel integration manager formulates the query with consumer identifying information that is included with the transaction session identifier. Consumer identifying information can include one or more of: a customer name, a consumer address, a consumer email, a consumer phone number, and the like. To establish the transaction at the SST, the consumer may have supplied some or the entire consumer identifying information by: entering the information manually via an input mechanism of the SST and scanning or inserting a loyalty card having the information. The channel integration manager can rely on a service directly interfaced to the SST for the identifying information or can use some details supplied by the service (such as customer number) to populate the identifying information by using a loyalty system and the customer number to look up the consumer ("consumer" and "customer" can be used interchangeably herein) in the loyalty system where a record includes the identifying information for the consumer.

In another case, at 222, the channel integration manager determines the selected advertisement service based on evaluation of pre-defined policy conditions that the channel integration manager is configured to access and evaluate. These policy conditions can be based on a variety of conditions, such as but not limited to: an identity of the SST, an identity of the consumer, a physical location of the SST, a time of day, a calendar day, licensing terms between the channel integration manager and advertisement services, preferences of the consumer, and others.

At 230, the channel integration manager communicates the anonymous session identifier (can be a link or handle along with network connection details (perhaps embedded in the link, which is a Uniform Resource Locator (URL) link) to the selected advertisement service. This provides a mechanism for the selected advertisement service to integrate into the ongoing SST transaction session occurring on the SST between the consumer and an enterprise associated with the SST.

According to an embodiment, at 231, the channel integration manager provides a profile for the consumer to the selected advertisement service. This can be a loyalty profile for the consumer for an enterprise associated with the channel integration manager or for an enterprise that the channel integration manager has authorized access to. The profile may be different than other profiles for the consumer known to the selected advertisement service, such that selected advertisement can use the profile to customize targeted advertisements to the consumer during the transaction at the SST. It may also be that the selected advertisement service lacked a profile for the consumer at the SST, such that the provided profile allows the selected advertisement service to begin monitoring and customizing advertisements to the consumer in other channels 110 where the consumer can be detected.

In an embodiment, at 232, the channel integration manager provides consumer identifying information with the transaction session identifier to the selected advertisement service to identify the consumer. Again, this permits the selected advertisement network to serve the consumer targeted and relevant advertisements across multiple channels 110 (including the channel associated with the SST, which can be an ATM channel).

In an embodiment, the identity of the consumer remains anonymous to the selected advertisement network and the channel integration manager provides with the anonymous session identifier an anonymous profile for the consumer known to the channel integration manager. This provides options to consumers that wish to remain anonymous during SST transactions but still allows the selected advertisement service to customize advertisements served to that consumer while at the SST.

At 240, the channel integration manager facilitates the proxying of an advertisement interface supplied by the selected advertisement service concurrent with an existing interface associated with the transaction that is occurring in real time on the SST with the consumer. By "facilitates" it is meant that the channel integration manager acts as a conduit between a service (such as the financial service cloud 140), which has the ability to access the transaction and/or monitor the existing interface, and the selected advertisement service for purposes of providing the advertisement interface to the SST with the existing interface during the transaction.

According to an embodiment, at 241, the channel integration manager passes the advertisement interface as a script that is executed on the SST. When the advertisement interface is executed on the SST, the advertisement interface produces presentations that are presented in a defined region representing an overlaid screen on a display of the SST where the consumer is performing the transaction with the SST. Other screens having other presentations associated with the existing interface are available concurrently with the overlaid screen.

In an embodiment, at 242, the channel integration manager passes the transaction session identifier and the advertisement interface to a financial service (such as financial service cloud 140) having access to the transaction to proxy the advertisement interface during the transaction of the consumer while at the SST. The channel integration manager uses the mapping to link the selected advertisement service's anonymous session identifier back to the transaction session identifier so that the financial service can locate the proper transaction (and since the financial service may be completely unaware of the anonymous session identifier and what it means).

It is noted that the advertisement interface can be a link embedded within an image (targeted advertisement image) that when activated establishes the anonymous session between the consumer and the selected advertisement service. Alternatively, the advertisement interface can be script as described above that creates the anonymous session without any action being required by the consumer during the transaction at the SST. Still further, the advertisement interface can be an image or a form (with no direct execution or linking capabilities or with such embedded capabilities turned off for security reasons), where the actions of the consumer with respect to areas of the image or fields of the form are monitored and relayed back from the transaction session of the SST to selected advertisement service for a response (responses from the selected advertisement service (which may alter presentations in the first screen) are communicated back for delivery to the display of the SST).

Figure 3:
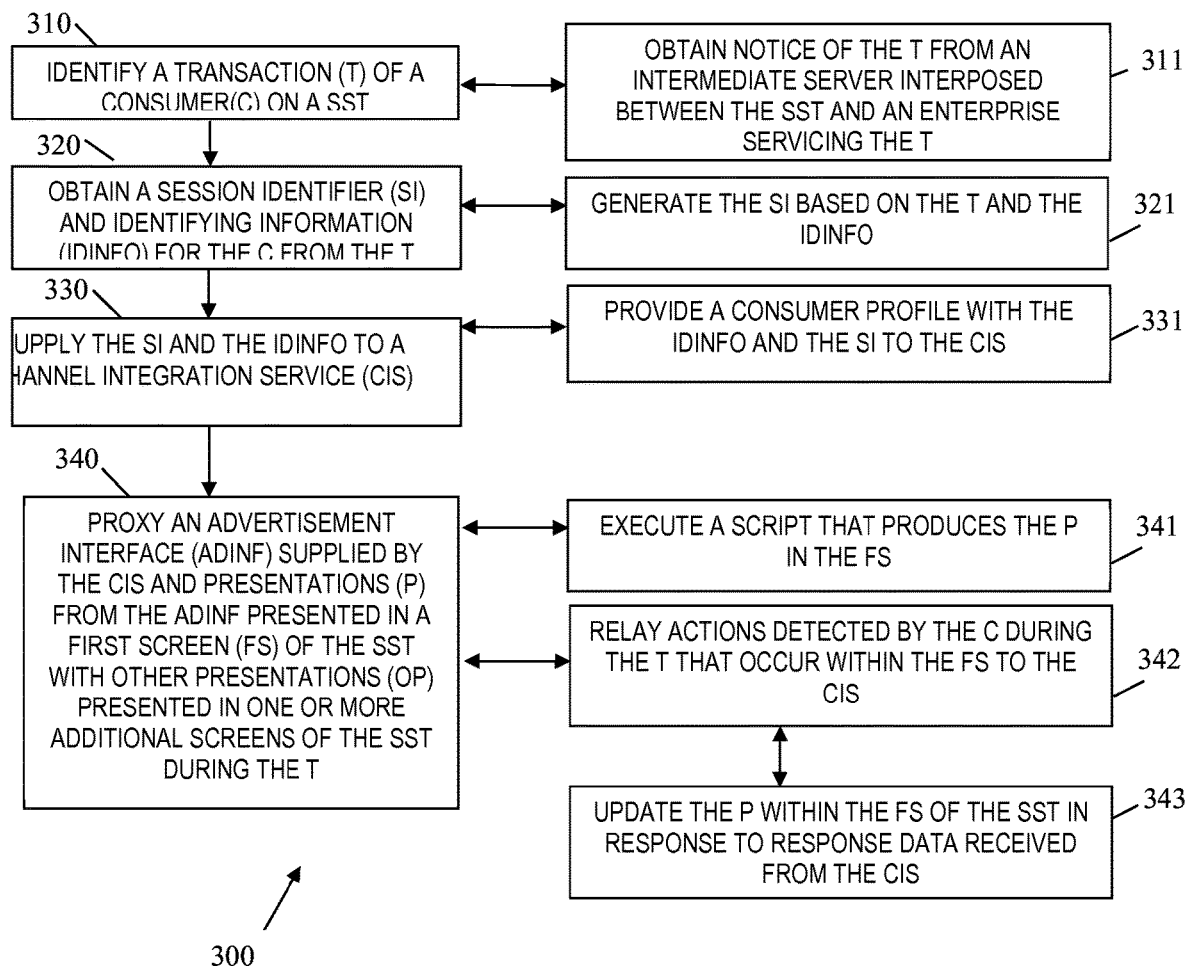
FIG. 3 is a diagram of another method for advertisement channel integration, according to an example embodiment.

FIG. 3 is a diagram of another method 300 for advertisement channel integration, according to an example embodiment. The software module(s) that implements the method 300 is referred to as a "financial interface manager." The financial interface manager is implemented as executable instructions programmed and residing within memory and/or a non-transitory computer-readable (processor-readable) storage medium and executed by one or more processors of a device. The processors of the device that executes the financial interface manager are specifically configured and programmed to process the financial interface manager. The financial interface manager has access to one or more networks during its processing. The networks can be wired, wireless, or a combination of wired and wireless.

In an embodiment, financial interface manager is the financial service cloud 140 of the FIG. 1.

At 310, financial interface manager identifies a transaction of a consumer on a SST.

According to an embodiment, at 311, the financial interface manager receives notice of the transaction from an intermediate server interposed as a proxy server between the SST and an enterprise that is servicing the transaction (such as financial cloud 150 for a financial transaction occurring on a SST that is an ATM 110G).

At 320, the financial interface manager obtains a session identifier and identifying information for the consumer from data associated with the transaction. For example, a customer number in the data with the transaction may permit a loyalty record for the consumer to be located to retrieve the identifying information.

According to an embodiment, at 321, the financial interface manager generates the session identifier based on the transaction and the identifying information.

At 330, the financial interface manager supplies the session identifier (handle) and the identifying information to a channel integration service (such as the channel integration server 130 or the channel integration manager (discussed in the FIG. 2 above)).

In an embodiment, at 331, the financial interface manager provides a consumer profile with the identifying information and the session identifier to the channel integration service. Here, it may be that the loyalty system used to acquire the consumer profile is unavailable to the channel integration service, such that it can be provided by the financial interface manager to the channel integration service.

At 340, the financial interface manager proxies an advertisement interface supplied by the channel integration service (as possibly acquired from a selected advertisement network 120) to the transaction at the SST. Presentations produced by the advertisement interface presented in a first screen of a display for the SST along with other presentations presented in one or more additional screens of the display during the transaction. The other presentations being generated by an existing interface of the SST that is being used to service the ongoing transaction of the consumer with an enterprise associated with the SST. This permits channel knowledge for the consumer to be utilized during the transaction at the SST, as if the consumer were searching the Internet on a laptop, even when the SST may be completely divorced and lack access to channels associated with the Internet (can be any or multiple channels 110)).

According to an embodiment, at 341, the financial interface manager executes a script that produces the presentations.

In an embodiment, at 342, the financial interface manager relays actions detected by the consumer during the transaction with respect to the advertisement interface in the first screen to the channel integration service.

In an embodiment of 342 and at 343, the financial interface manager also updates the presentations associated with the advertisement interface to the first screen in response to response data received back from the channel integration service.

Figure 4:
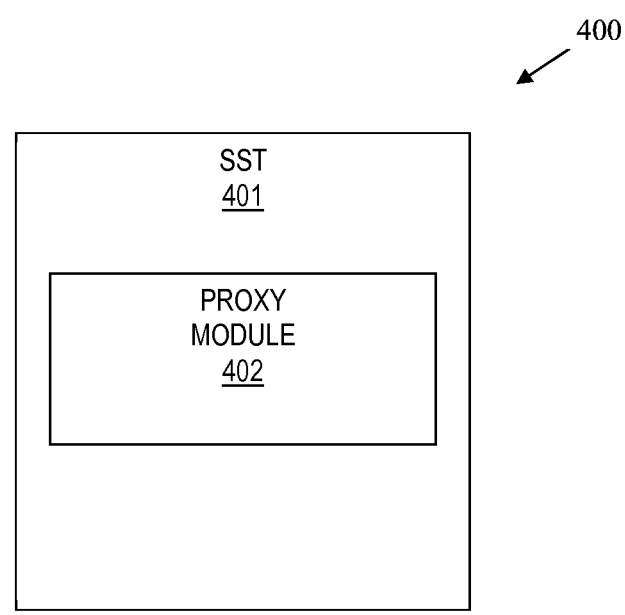
FIG. 4 is a diagram of a SST having advertisement channel integration capabilities, according to an example embodiment.

FIG. 4 is a diagram of a SST 400 having advertisement channel integration capabilities, according to an example embodiment. The components of the SST 400 are programmed and reside within memory and/or a non-transitory computer-readable medium and execute on one or more processors of one or more devices. The SST 400 has access and can communicate over one or more networks; and the networks can be wired, wireless, or a combination of wired and wireless.

The SST 400 includes a SST 401 having a proxy module 402 programmed within memory and/or a non-transitory computer-readable storage media as executable instructions of the SST 400.

In an embodiment, the SST 401 is an ATM.

In another embodiment, the SST 401 is a kiosk.

The proxy module 402 is operable to: identify a transaction at the SST 401 and proxy an advertisement interface that produces first presentations on a first screen of the display simultaneously with other presentations produced during the transaction on at least one other screen of the display. The details of identifying the transaction and techniques for proxying the advertisement interface, as well as what that advertisement interface can be, were presented in detail above with reference to the FIGS. 1-3.

According to an embodiment, the proxy module 402 if further operable to interact with a channel integration service (channel integration server 130 and/or the channel integration manager described with the FIG. 2 above) to acquire the advertisement interface.

In an embodiment, the proxy module 402 is further operable to select an advertisement service (advertisement network 120) to supply the advertisement interface. Here, the proxy module is performing functions defined above for the channel integration service 130 and/or the channel integration manager described above with reference to the FIG. 2.

In an embodiment, the proxy module 402 is further operable to supply a financial service (such as channel integration server 130 and/or the channel integration manager of the FIG. 2 and operating in mode associated with an ATM transaction) with a session identifier for the transaction that uniquely identifies the transaction and the consumer.

In an embodiment of the last embodiment, the proxy module 402 is further operable to supply consumer identifying information and a customer profile for the consumer with the session identifier to the financial service.

It should be appreciated that where software is described in a particular form (such as a component or module) this is merely to aid understanding and is not intended to limit how software that implements those functions may be architected or structured. For example, modules 120, 130, and 140 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method, comprising:
  mapping, by executable instructions that execute on a processor of a device from a non-transitory computer-readable storage medium as a channel integration manager, a transaction session identifier associated with a transaction session for a transaction of a consumer at a Self-Service Terminal (SST) occurring in real time to an anonymous session identifier by anonymizing the transaction session identifier in the anonymous session identifier associated with an anonymous session, wherein the anonymous session identifier representing an anonymous session handle for the anonymous session;
  selecting, by the channel integration manager, an advertisement service;
  communicating, by the device, the anonymous session identifier to the selected advertisement service;
  facilitating, by the channel integration manager, the proxying of an advertisement interface supplied by the selected advertisement service to the anonymous session identifier with an existing interface associated with the transaction occurring on the SST in real time to the transaction session identifier, and providing the selected advertisement service access to the transaction during the transaction through the proxied advertisement interface and overlaying the advertising interface on top of the existing interface during the transaction, and preventing the proxied advertisement interface from discovering details for the SST, the transaction, and the environment for the SST during the transaction on the SST, wherein facilitating further includes acting by the device as a communication pipe between the advertisement interface and the existing interface during the transaction and providing the overlaying through image processing of images produced by the selected advertisement service and relaying selected fields of the images activated during the transaction to the selected advertisement service and altering presentations of the images provided in the advertisement interface based on responses received from the selected advertisement service during the transaction;

confirming, by the channel integration manager, a payment for a good or service provided to the selected advertisement service within the proxied advertisement interface during the transaction by integrating a payment mechanism being used by the consumer for the transaction at the SST within the transaction session to the advertisement service during the anonymous session as payment for the good or service on behalf of the consumer, wherein confirming further includes providing a financial profile for the consumer to the advertisement interface that is attached as an anonymous session cookie, wherein the financial profile identifying the payment mechanism being used by the consumer for the transaction at the SST, and wherein the advertisement service lacks access to the financial profile that identifies the payment mechanism until the anonymous session cookie is attached to the anonymous session identifier and provided to the advertisement service during the anonymous session; and presenting, by the channel integration manager, a Quick Response (QR) code within the proxied advertisement service for capturing by a mobile device camera operated by the consumer performing the transaction at the SST, wherein the QR code provided as evidence of payment for the good or service by the selected advertisement service.

2. The method of claim 1, wherein mapping further includes acquiring the transaction session identifier from a financial service having access to the transaction.

3. The method of claim 1, wherein selecting further includes querying a plurality of advertisement services to select the selected advertisement service using consumer identifying information included with the transaction session identifier.

4. The method of claim 1, wherein selecting further includes determining the selected advertisement service based on evaluation of policy conditions for the transaction session identifier.

5. The method of claim 1, wherein communicating further includes providing a profile for the consumer to the selected advertisement service.

6. The method of claim 1, wherein communicating further includes providing consumer identifying information with the transaction session identifier to the selected advertisement service for the advertisement service to identify the consumer.

7. The method of claim 1, wherein facilitating further includes passing the transaction session identifier and the advertisement interface to a financial service having access to the transaction and the existing interface of the SST.

8. A Self-Service Terminal (SST), comprising:
a display; and
one or more processors;
a non-transitory computer-readable storage medium;
a proxy module programmed within memory as executable instructions that executes on the one or more processors from the non-transitory computer-readable storage medium, the proxy module configured to perform processing to:

(i) identify a transaction at the SST occurring in real time;

(ii) proxy an advertisement interface to produce first presentations on a first screen of the display associated with an anonymous session identifier for an anonymous session and simultaneously to produce other presentations during the transaction on the least one other screen of the display associated with a transaction session identifier for a transaction session, wherein an advertisement service has access to the transaction during the transaction through the proxied advertisement interface and wherein the advertisement interface is overlaid on top of an existing interface for the transaction during the transaction, and the proxy module further configured to provide security to the SST, an environment for the SST, and the transaction through the anonymous session identifier that prevents the proxied advertisement interface from discovering details for the SST, the transaction, and an environment for the SST during the transaction on the SST, and provide a communication pipe between the proxied advertisement interface and the existing interface, and provide the proxied advertisement interface as overlaid images produced by the advertisement service and relay selected fields of the images activated during the transaction to the advertisement service and alter presentations of the images provided in the advertisement interface based on responses received from the advertisement service during the transaction, wherein the anonymous session identifier provides an anonymous session handle to the anonymous session;

(iii) confirm a payment for a good or service provided to the advertisement service within the proxied advertisement interface during the transaction by integrating a payment mechanism being used by a user conducting the transaction at the SST within a transaction session associated with the transaction session identifier to the advertisement service as payment for the good or service on behalf of the consumer, wherein an anonymous session cookie provided to the proxied advertisement interface as an attachment that includes a financial profile of the user and the financial profile including the payment mechanism being used by the user in conducting the transaction at the SST and wherein the advertisement service lacks access to the financial profile that identifies the payment mechanism until the anonymous session cookie is attached to the anonymous session identifier and provided to the advertisement service during the anonymous session; and (iv) present a Quick Response (QR) code within the proxied advertisement service for capturing by a mobile device camera operated by the user performing the transaction at the SST, wherein the QR code provided as evidence of payment for the good or service by the advertisement service.

9. The SST of claim 8, wherein the proxy module is further to: (iii) interact with a channel integration service to acquire the advertisement interface.

10. The SST of claim 8, wherein the proxy module is further to: (iii) select an advertisement service to supply the advertisement interface.

11. The SST of claim 8, wherein the proxy module is further to: (iii) supply a financial service with a session identifier that uniquely identifies the transaction.

12. The SST of claim 8, wherein the proxy module is further to: (v) supply consumer identifying information and a customer profile for a consumer with the session identifier to the financial service, the consumer engaged in the transaction at the SST.

* * * * *